United States Patent Office  3,135,790
Patented June 2, 1964 }

3,135,790
PRODUCTION OF N-SUBSTITUTED-N'-(HYDROXY-ALKYL)-METHYLUREAS AND THIO UREAS
Roy G. Neville, Palos Verdes Estates, Calif., assignor to Monsanto Company, a corporation of Delaware
No Drawing. Filed Sept. 10, 1962, Ser. No. 222,701
3 Claims. (Cl. 260—552)

This invention is a continuation in part of copending application S.N. 648,519, filed March 26, 1957, now abandoned, and relates to N-substituted-N'-(hydroxyalkyl)methylurea compounds. More particularly, the invention relates to the reaction of isocyanates or isothiocyanates with hydroxyalkyl-substituted methylamines.

N-substituted-N' - tris(hydroxymethyl)methylureas, in which the substituents are of the group consisting of phenyl, o- and p-tolyl, and 1- and 2-naphthyl, have been prepared by reaction of equimolar amounts of aromatic isocyanate with tris-(hydroxymethyl)methylamine in chloroform solution. However, this method suffers from the disadvantage that tris(hydroxymethyl)methylamine is insoluble in chloroform, resulting in erratic reactions with poor yields.

One object of this invention is to provide a process which proceeds at smooth rates of reaction to produce high yields of N-substituted-N'-(hydroxyalkyl)methylurea compounds.

Another object is to provide new products of reaction of isocyanates with N'-(hydroxyalkyl)methylamine compounds.

A further object is to provide new compounds for use in the synthesis of pharmaceutical chemicals.

A further object is to provide new film-forming compounds for use as emulsifying agents, etc.

A further object is to provide new water-repellent compounds.

A further object is to provide new compounds for use in the synthesis of resinous compositions.

A further object is to provide compounds capable of slow and controllable liberation of formaldehyde.

These and other objects are attained by reacting an isocyanate or isothiocyanate with a hydroxyalkyl-substituted methylamine in alcohol solution to form compounds corresponding to the general formula:

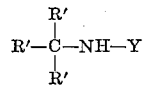

wherein R, R', X, and Y are radicals as disclosed below.

The following examples are given in illustration of the invention.

EXAMPLE I

A reaction vessel is charged with a hot solution consisting of 1 mol of tris(hydroxymethyl)methylamine dissolved in 14 mols of water. 5.3 mols of isopropanol are added and the mixture is heated to boiling under reflux. During the course of 2 minutes, 1 mol of o-biphenylyl isocyanate, followed by 2.3 mols of isopropanol, is added dropwise. The mixture is refluxed for 10 minutes and then allowed to cool. The urea derivative, N-(o-biphenylyl) - N' - tris(hydroxymethyl)methylurea, is then filtered and recrystallized from isopropanol, with a 95% yield.

EXAMPLE II

A reaction vessel is charged with a hot solution consisting of 1 mol. of 2-amino-1-butanol dissolved in 16 mols of water. Nine mols of methanol are added and the mixture is heated to boiling under reflux. During the course of about 5 minutes, 1 mol of phenyl isocyanate, followed by 5 mols of methanol, is added dropwise. The mixture is refluxed for 10 minutes and then allowed to cool. The urea derivative, N-phenyl-N'-(ethylhydroxymethyl)methylurea, is then filtered and recrystallized from isopropanol, with a yield of about 85%.

EXAMPLE III

Example I is repeated substituting 2-amino-2-methyl-1,3-propanediol for the tris(hydroxymethyl)methylamine employed therein. The urea derivative, N-(o-biphenylyl)-N'-(dihydroxymethyl-methyl)methylurea, is obtained in substantially equivalent yield.

The primary and secondary hydroxyalkyl amines suitable for use in the process of this invention correspond with the general formula:

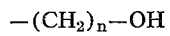

wherein Y is hydrogen or a methyl radical and R' may be any combination of 3 members from the group consisting of hydrogen, 1–2 carbon atom alkyl radicals and hydroxyalkyl radicals corresponding with the general formula:

$$-(CH_2)_n-OH$$

wherein $n$ is an integer of from 1 to 4. However, at least 1 of such R' groups must be a hydroxyalkyl. In addition to the tris(hydroxymethyl)methylamine, 2-amino-1-butanol and 2-amino-2-methyl-1,3-propanediol employed in the examples, such other primary and secondary hydroxyalkyl amines as, for example, bis(hydroxyethyl)methylamine, tris(hydroxymetyl)methyl - methylamine, mono(hydroxybutyl)methylamine, etc., may be used with equivalent results. In the reaction, the hydroxyalkyl amino compound must first be dissolved in a solvent consisting of from 10 to 16 mols of water and from 6 to 14 mols of alcohol per mol of amine.

The isocyanates suitable for use in the process of this invention are mono-functional isocyanates and isothiocyanates corresponding with the general formula:

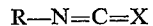

wherein X is a chalcogen of the group consisting of oxygen and sulfur, and R is a 1–18 carbon atom hydrocarbon radical. In addition to the o-biphenylyl isocyanate and phenyl isocyanate shown in the examples and the allyl isocyanate, isopropyl isocyanate, n-butyl isocyanate, n-amyl isocyanate, cyclohexyl isocyanate, n-octyl isocyanate, n-dodecyl isocyanate, n-octadecyl isocyanate derivatives shown in Table I, such other isocyanates as methyl isocyanate, ethyl isocyanate, naphthyl isocyanate, etc., and all of the corresponding isothiocyanates may be used with equivalent results. In the reaction, substantially equimolar proportions of the isocyanate or isothiocyanate and hydroxyalkyl amine are reacted.

The alcohols suitable for use in the process of this invention are aliphatic alcohols containing 1–3 carbon atoms, such as methanol, ethanol, n- and iso-propanol, and allyl alcohol. However, isopropanol is preferred.

The primary advantage of the process of this invention is that a homogeneous reaction mixture is produced by first dissolving the amine in dilute alcohol-water solution before reaction with the isocyanate. The mixture is heated to boiling under reflux and isocyanate is added dropwise to the mixture over a period of 1–5 minutes. In cases where precipitation occurs after isocyanate addition an immediate further addition of alcohol ensures solution of the reactants. The reaction mixture is refluxed for 5–20 minutes and then is allowed to cool. The urea derivatives obtained range from colorless crystalline compounds (low molecular weight) to white waxy solids (high molecular weight). Higher yields of product and smoother reaction conditions are further advantages of this process.

The following table shows some physical properties for a number of compounds produced by the process of this invention.

Table I
N-SUBSTITUTED-N'-TRIS(HYDROXYMETHYL)METHYLUREAS R—NHCONHC(CH$_2$OH)$_3$

| R | Percent Yield | M.P., °C. (Uncor.) | Nitrogen, Percent | |
|---|---|---|---|---|
| | | | Calculated | Found |
| Allyl | 79 | 140 | 13.72 | 13.45 |
| Isopropyl | 75 | 165 | 13.59 | 13.49 |
| n-Butyl | 82 | 145 | 12.72 | 12.21 |
| n-Amyl | 81 | 162 | 11.96 | 11.77 |
| Cyclohexyl | 82 | 189 | 11.38 | 11.26 |
| n-Octyl | 79 | 140 | 10.14 | 9.87 |
| n-Dodecyl | 89 | 141 | 8.43 | 8.37 |
| o-Biphenylyl | 95 | 188 | 8.86 | 8.43 |
| n-Octadecyl | 97 | 64 | 6.73 | 6.38 |

Compounds of this invention formed by the reaction of long-chain isocyanates of 10 or more carbon atoms with hydroxyalkyl methylamines, are useful as film-forming compounds in paint and decorative laminating formulations and emulsifying agents. Other compounds of this invention may be useful in the synthesis of new types of pharmaceutical chemicals, or as water-repelling, or waterproofing, chemicals for proteinaceous and cellulosic materials, e.g., paper, wood veneers.

The poly-functional urea compounds of this invention may be used in the synthesis of resinous compositions; e.g., by reaction with epoxides, ethyleneimine-type compounds, etc. Compounds of this invention, containing the hydroxymethyl groups, and particularly the compounds containing three hydroxymethyl groups, may be used in such processes as require a slow and controlled liberation of formaldehyde in basic solution.

It is obvious that many variations may be made in the products and processes set forth above without departing from the spirit and scope of this invention.

What is claimed is:

1. A process for preparing N-substituted-N'-(hydroxyalkyl)methylurea compounds wherein a member of the group consisting of isocyanates and isothiocyanates is reacted with a hydroxyalkyl-substituted methylamine in an aqueous alcoholic solution wherein the alcohol contains from 1–3 carbon atoms, the ratio of water and alcohol being from 10–16 mols and 6–14 mols, respectively, per mol of said hydroxyalkyl-substituted methylamine; said isocyanates and isothiocyanates corresponding to the general formula:

$$R\!-\!N\!=\!C\!=\!X$$

wherein X is a chalcogen selected from the group consisting of oxygen and sulfur and R is a radical selected from the group consisting of alkyl, aryl and aralkyl radicals containing from 1–18 carbon atoms; said hydroxyalkyl-substituted methylamine corresponding to the general formula:

$$\begin{array}{c} R' \\ | \\ R'\!-\!C\!-\!NH\!-\!Y \\ | \\ R' \end{array}$$

wherein Y is a radical selected from the group consisting of hydrogen and methyl radicals and R' are radicals independently selected from the group consisting of hydrogen, methyl, ethyl, and hydroxyalkyl groups containing from 1–4 carbon atoms, at least one such R' radical being a hydroxyalkyl radical.

2. A process as in claim 1 wherein the alcohol is isopropanol.

3. A process as in claim 1 wherein the hydroxyalkyl-substituted methylamine is tris(hydroxymethyl)methylamine.

No references cited.